United States Patent [19]

Pitroda

[11] 3,710,028

[45] Jan. 9, 1973

[54] DETECTOR FOR DIGITALLY TRANSMITTED MULTIFREQUENCY TONES AS UTILIZED FOR SIGNALING IN A PULSE CODE MODULATED TELEPHONE SYSTEM

[75] Inventor: Satyan G. Pitroda, Villa Park, Ill.

[73] Assignee: GTE Automatic Electric Laboratories Incorporated, Northlake, Ill.

[22] Filed: Nov. 10, 1970

[21] Appl. No.: 88,428

[52] U.S. Cl.............................179/15 BY, 179/16 EC

[51] Int. Cl..............................................H04q 11/00

[58] Field of Search.......179/15 AP, 15 BY, 16 A, 16 AA, 179/16 EC, 16 G, 1 SA, 84 VF, 99, 7 R, 7 MM, 7.1, 18 AD; 329/104; 178/2 R, 88 R, 68 R; 325/38 R, 38 B, 43; 328/27, 164; 235/92 TE

[56] References Cited

UNITED STATES PATENTS

| | | | |
|---|---|---|---|
| 3,504,290 | 3/1970 | Earle | 328/164 |
| 3,050,589 | 8/1962 | Vaughan | 179/15 BY |
| 2,991,422 | 7/1961 | Yaeger | 329/104 |

*Primary Examiner*—Kathleen H. Claffy
*Assistant Examiner*—Randall P. Myers
*Attorney*—Cyril A. Krenzer, K. Mullerheim, B. E. Franz and Robert J. Black

[57] ABSTRACT

A technique for detecting multifrequency tones on a digital basis in a pulse code modulated telephone system. Tone pairs are detected based on a determination of the quantity of zero slope counts and peak detector counts for a specific period of time.

6 Claims, 7 Drawing Figures

INVENTOR
SATYAN G. PITRODA
BY R. J. Black
AGENT

GATING CIRCUIT 110

GATING CIRCUIT 110

TYPICAL TONE PAIR AND SAMPLES

TIMING DIAGRAM FOR THE MF TONE RECEIVED IN CH. 3

ZERO SLOPE COUNT & PEAK DETECT COUNT

DETECTOR FOR DIGITALLY TRANSMITTED MULTIFREQUENCY TONES AS UTILIZED FOR SIGNALING IN A PULSE CODE MODULATED TELEPHONE SYSTEM

BACKGROUND OF THE INVENTION

1. Field of the Invention

The invention relates generally to signaling techniques in telephone communication systems, and more particularly to the detection of digitally coded signals that are the equivalent of conventional analog multifrequency tone signals.

At the present time the utilization of multifrequency pulsing for signaling in telephone systems has become quite common. The present analog multifrequency pulsing system utilizes various combinations of two-out-of-six basic tone frequencies in the voice band. The six tone frequencies are from 700 Hz. to 1,700 Hz., spaced 200 Hz. apart. These six frequencies provide fifteen possible two tone or two frequency combinations. Each combination represents a tone pair which is interpreted as a transmitted digit. Obviously ten combinations are used for the digits 0 through 9 inclusive and the remaining combinations are used for special signals. Inasmuch as the signals generated are within the voice frequency range, information generated in this manner is sent over regular talking channels.

2. Description of the Prior Art

In general, multifrequency tone detection techniques for touch tone signaling have employed the use of band separation filters, to determine both high and low frequency components followed by amplification and the utilization of narrow band pass filters. If a filter then passes a particular frequency a Schmidt trigger or similar circuit operates. Since the tone pair is a combination of two-out-of-six frequencies any two Schmidt triggers firing would indicate the presence of a particular tone. This information is then registered for further processing in the telephone exchange.

In pulse code modulated systems a binary word is received representing the pulse amplitude modulated sample of the original waveform. In order to utilize existing analog multifrequency receivers as are presently utilized in telephone systems, the received binary information must be decoded. The process of decoding is not only expensive, but requires the use of analog systems in a digital exchange. Such techniques require further decoding and the use of expensive and bulky filters.

Thus it may be observed the translation of signaling tones economically in a pulse code modulated exchange is highly desirable. One approach is to convert the pulse code modulated information back to analog and then use analog receivers. The only approach previously suggested to remove tones off a pulse code modulated line without converting them back into analog signals is to utilize digital filtering. The utilization of digital filtering, however, requires extensive computation and many components rendering it too uneconomical. It would appear that the technique suggested herein is not disclosed in the prior art.

SUMMARY OF THE INVENTION

The presently disclosed technique of detecting multifrequency tones digitally in a pulse code modulated system without the use of filters employs the following technique. Initially the tone pair is identified from the number of zero slope counts and the peak detector counts present in the waveform for a definite period of time. The zero slope count represents peaks and valleys of the original analog waveform, while the peak detector count represents the peaks of the envelope of the waveform.

The frequency group which includes the basic two frequencies of a tone pair and the difference between the two frequencies of the tone pair is monitored. The contents of the zero slope count corresponds to the highest frequency present in the group and the total number of peak detector counts represents the lowest frequency of the same frequency group. The zero slope count and the peak detector count are obtained easily from the received pulse code modulated words by a successive comparison.

The multifrequency tone pair may be represented by $$X = \operatorname{Sin} W_1 t + \operatorname{Sin}(W_2 + 100)t$$

where $w_1$ and $W_2$ are any of two-out-of-six frequencies (200 Hz. apart) and $\phi$ is the initial phase difference. For $\phi = 0$, the same expression can be written as: $X = 2\operatorname{Sin}At \cdot \operatorname{Cos}Bt$ where $$A = (W_1 + W_2)/2 \cdot B = (W_1 - W_2)/2$$

This shows that the tone pair is a modulated waveform consisting of the sum and difference of two frequencies.

Computer simulation studies indicate the total number of maximums and minimums present in the initial waveform represent the higher frequency of the tone pair, and the total number of maximums represents the difference in the two frequencies of the tone pair. The number of maximums and minimums are called the zero slope count and the greatest number of maximums of the maximums is called the peak detector count. Once the zero slope count and the peak detector count are available, detection of the tones is a matter of selecting $x$ and $y$ coordinates as shown in FIG. 7.

Signaling tone on a pulse code modulated line is in the form of a binary word. The technique of obtaining zero slope count and peak detector count requires the successive comparison of two binary words of the same channel. After receiving the information on the channel, 125 microseconds are available for processing this information. In the present invention two comparisons are made. First for comparing for the zero slope count and the second for peak detector count. An understanding of the implementation of the techniques suggested may be had by reference to the following drawing and a description of the preferred embodiment.

DESCRIPTION OF THE PREFERRED EMBODIMENT

Figure 1:
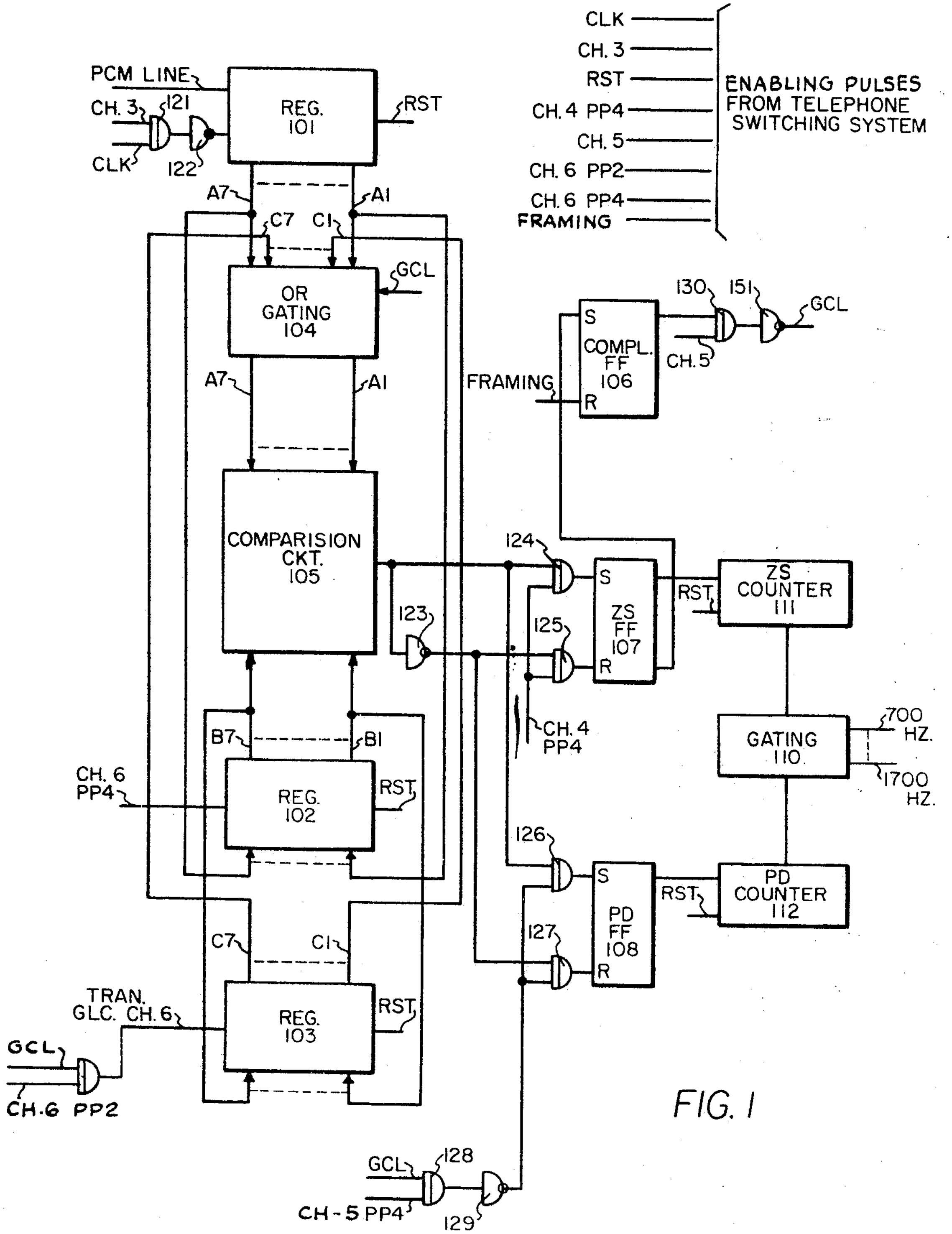
FIG. 1 is a block diagram of a digital multifrequency tone detector for use in a pulse code modulated system.
Figure 2:
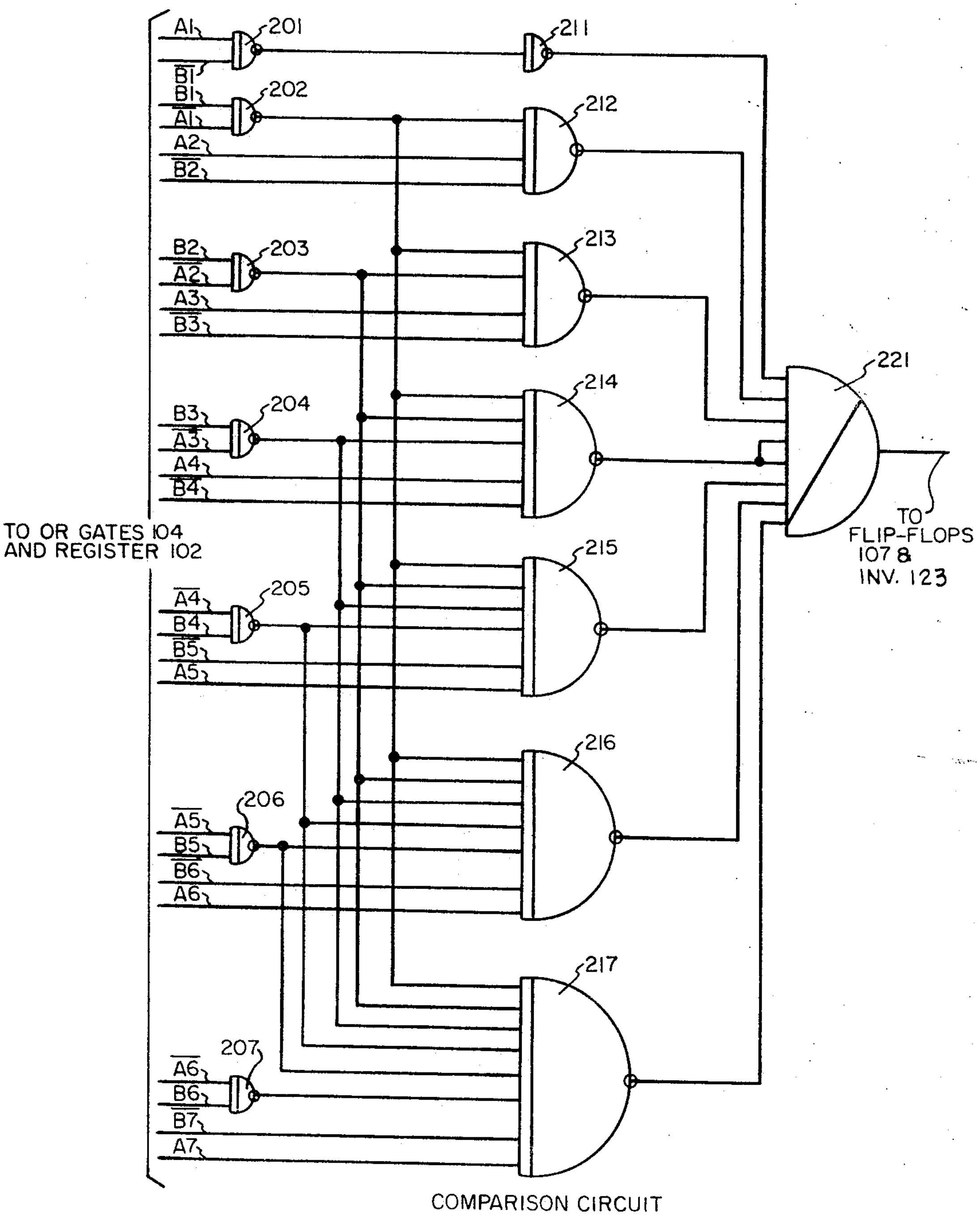
FIG. 2 is a functional diagram of a comparison circuit as disclosed in FIG. 1.
Figure 3:
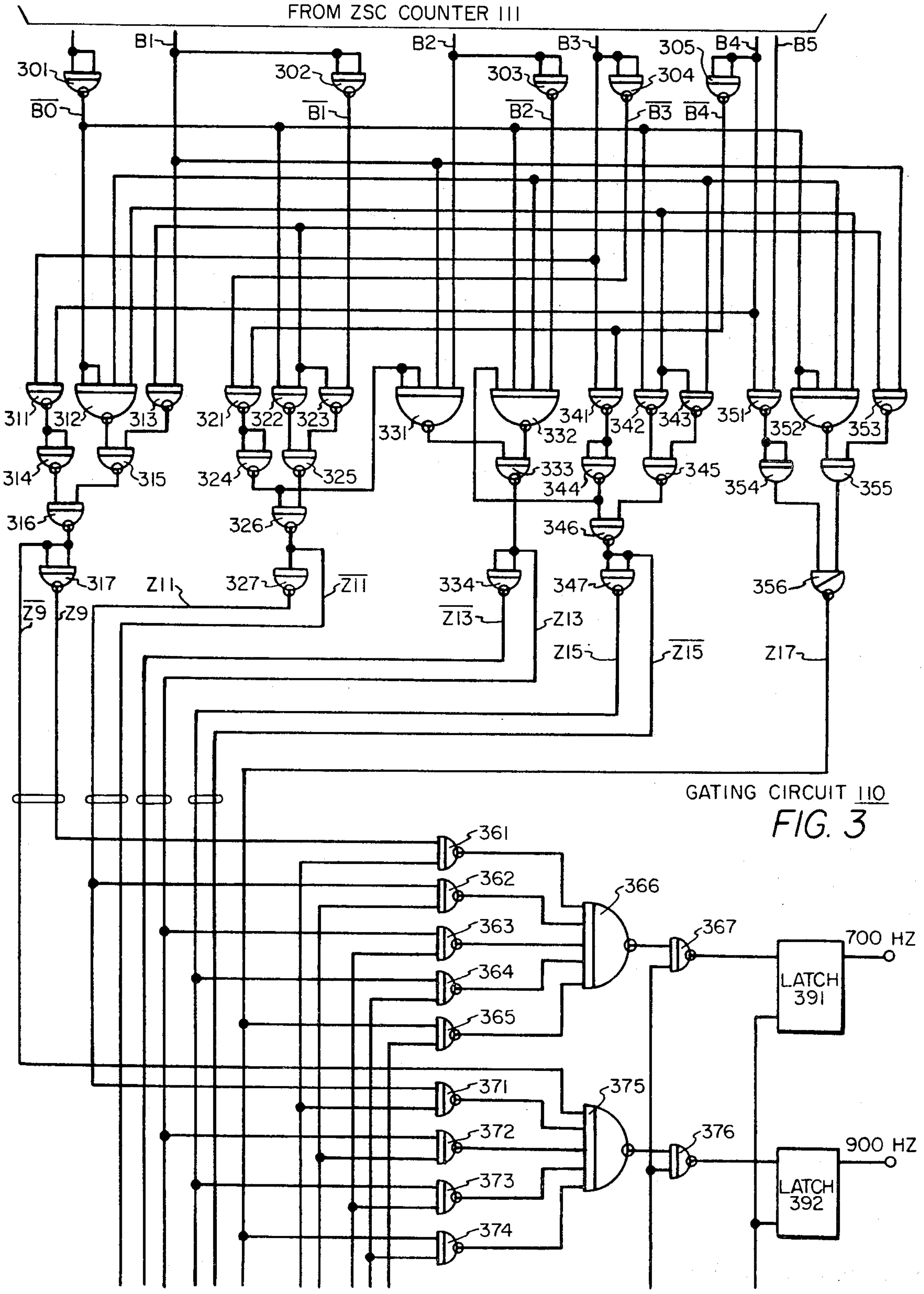
FIG. 3 and 4 in combination comprise, with FIG. 3 placed to the top of FIG. 4, a functional diagram of a gating circuit employed in the manner shown in FIG. 1.
Figure 4:
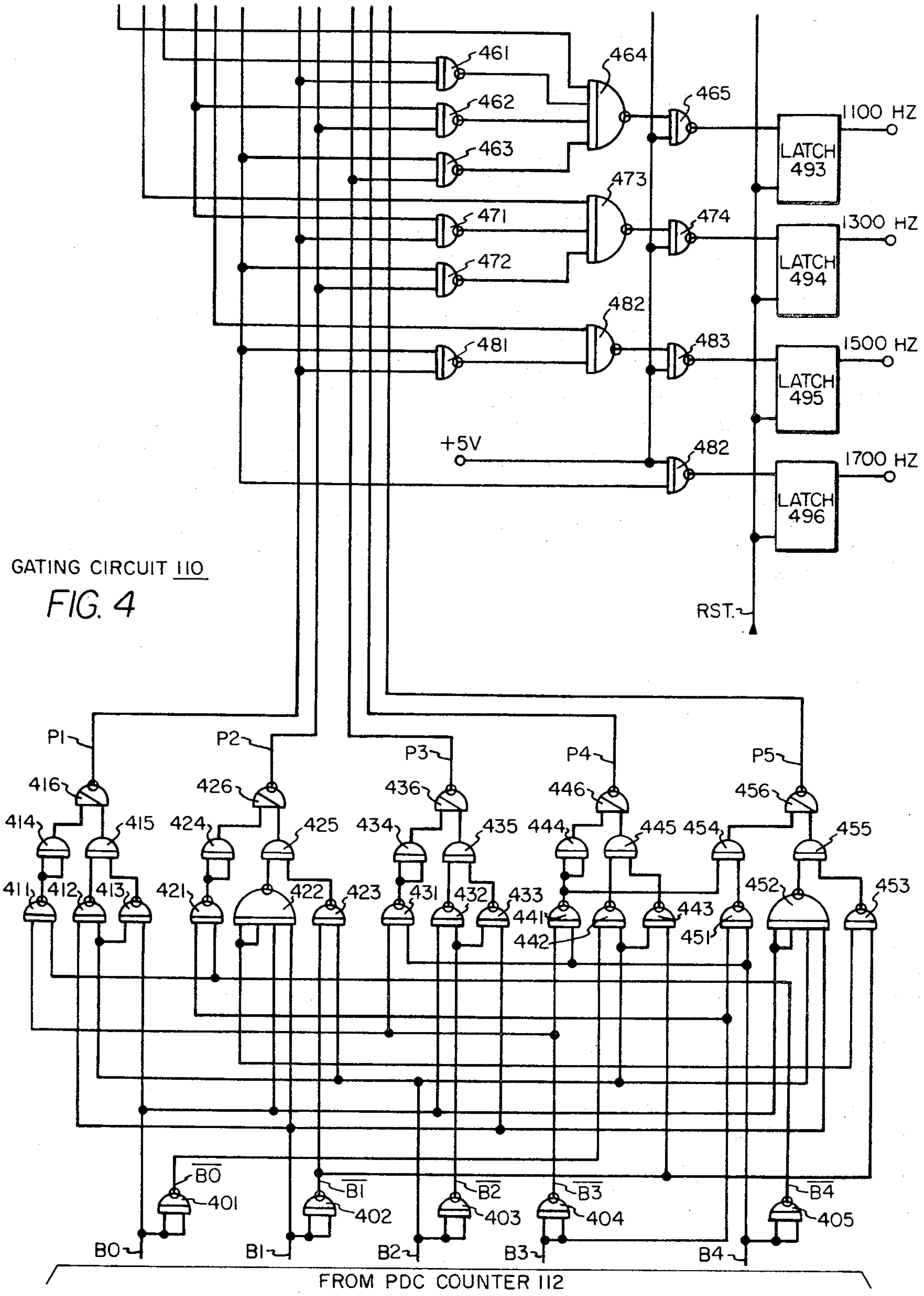

Implementation of the present invention is accomplished by means of integrated or discrete circuitry arranged in logic configurations as is shown in FIG. 1 and supplemental FIGS. 2, 3 and 4. These circuits include register 101 which is an 8 bit register arranged for serial input and parallel output. Registers 102 and 103 are similar to each other, both being of the 8 bit type, and both being of the parallel input, parallel output type.

The OR gating 104 shown in FIG. 1 consists of seven individual OR gates connected to the outputs of registers 101 and 103 and gated by the presence of a signal on the GCL or gating control lead. The output of each of these gates is connected to the comparison circuit 105.

The comparison circuit 105 shown in detail in FIG. 2 is a decision making circuit utilizing logic circuitry to compare the outputs of the registers. Based on such determination the output of the comparison circuit 105 is supplied to the zero slope flip-flop 107. This is a gated form of flip-flop and during a particular time period it may be set or reset from the output of the comparison circuit 105. The output of the comparison circuit 105 is also connected to an inverter 123 and with gated inputs to the peak detect flip-flop 108 which likewise is a gated flip-flop of conventional design.

The output of the zero slope flip-flop 107 is connected to the zero slope counter 111 and the peak detect flip-flop 108 to the peak detect counter 112. These are conventional binary counters. The outputs from the zero slope counter 111 and the peak detect counter 112 are connected through gating circuitry 110 shown in detail in FIGS. 3 and 4. Through the coded gating six latches 391, 392, 493, 494, 495 and 496 are accessed each of which represents a particular tone signal. In response to operation of the present circuitry two outputs are derived from the gating circuit 110, each representative of one of the two tones involved in a specific signal received from the pulse code modulated transmission facility.

Connected to and derived from the zero slope flip-flop is a complement flip-flop 106 which in combination with the presence of a framing pulse which operates to apply a signal to the gating control lead GCL which is used to set the peak detect flip-flop 108 and to control the OR gates 104 between registers 101 and 103 and the comparison circuit 105. Obviously detailed circuitry utilized in implementing the present circuit arrangement is conventional in nature and therefore is not shown in detail. Other modifications and arrangements in logic circuitry might also be employed without departing from the scope and intent of the present invention.

As shown in FIG. 1 various enabling pulses for the present circuitry are transmitted on a continuing basis from the associated telephone switching center. These pulses are derived from a pulse source that produces a train of pulses constituting one channel pulse (channel 1, channel 2, etc.) for each pulse code modulated channel connected to the present detector circuitry. Eight position pulses (1–8) are transmitted during the period of each channel pulse and a framing pulse is transmitted after the last position pulse in the last channel. For example, in a typical pulse code modulated transmission system eploying "T" type carrier, 24 channels are usually employed. (Channels 3–6 inclusive only, are shown in the present description.) The pulse train for this system would include 192 position pulses along with 24 channel pulses, each equivalent in length to eight position pulses, and an additional pulse with approximately the same duration as a position pulse referred to as a framing pulse for a total pulse train length of 193 pulses. A clock pulse is present for the entire duration of the above outlined train of 193 pulses, and a reset pulse occurs within the duration of the framing pulse.

The above pulses would normally be available in any switching office equipped to handle pulse code modulated signals. As an alternate, it would be possible to provide a local pulse source of conventional design associated directly with the present director which would provide similar pulses on a continuous and free-running basis.

Figure 5:
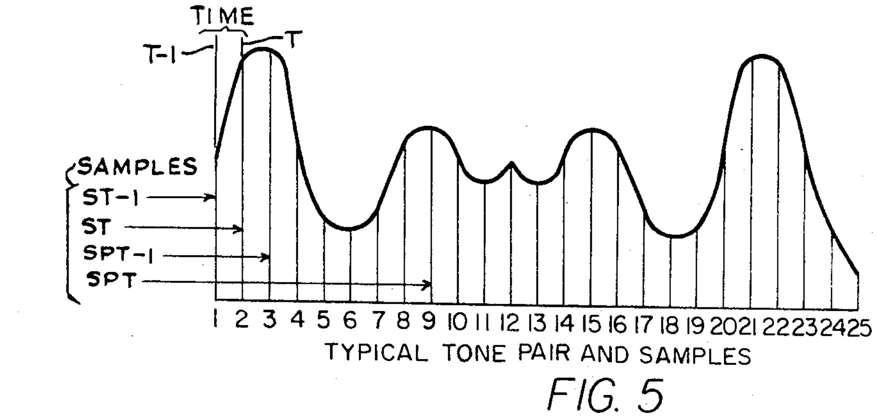
FIG. 5 is a diagram of a typical tone pair with pulse amplitude modulator samples.

Referring first to FIG. 5 there is shown a typical tone pair with pulse amplitude modulated samples. The maximum and minimum can be found from the successive comparison of these samples. St-1 and St would be the samples at time T-1 and T. At time T we compare St and St-1. If St-1 is less than St we will set a flip-flop. (Assuming that a flip-flop is equal to 0.) If St-1 is greater than St we reset a flip-flop. (Assuming the flip-flop to be equal to 1.) The leading edge of the flip-flop corresponds to the minimum and the trailing edge corresponds to the maximum. Similarly the greatest number of maximums is found by comparing samples Spt-1 and Spt, where Spt-1 is the sample when the last maximum was detected and Spt is the sample when the present maximum is detected. At the end, the contents of the zero slope counter and the peak detector counter are available from which the tone is detected through a gating structure.

Referring now to FIG. 1, the entire system is first reset by application of a signal pulse derived from the telephone switching system, on all reset leads. Resetting is thus accomplished of all registers, flip-flops and counters. Assume now that the multifrequency tone is received during channel 3. During channel 3, information from the pulse code modulated line or transmission facility is written into register 101. Register 101, as noted before has facility for storing eight bits and is of the serial in and parallel out type.

Figure 6:
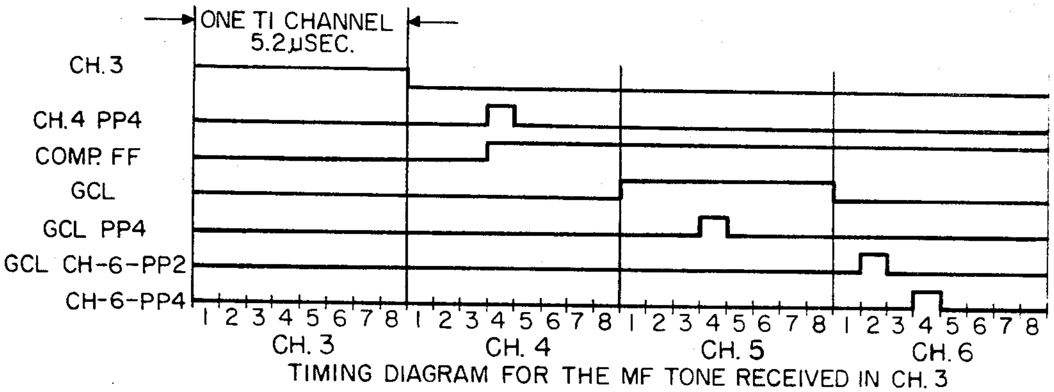
FIG. 6 is a timing diagram for a multifrequency tone received in channel 3.
Figure 7:
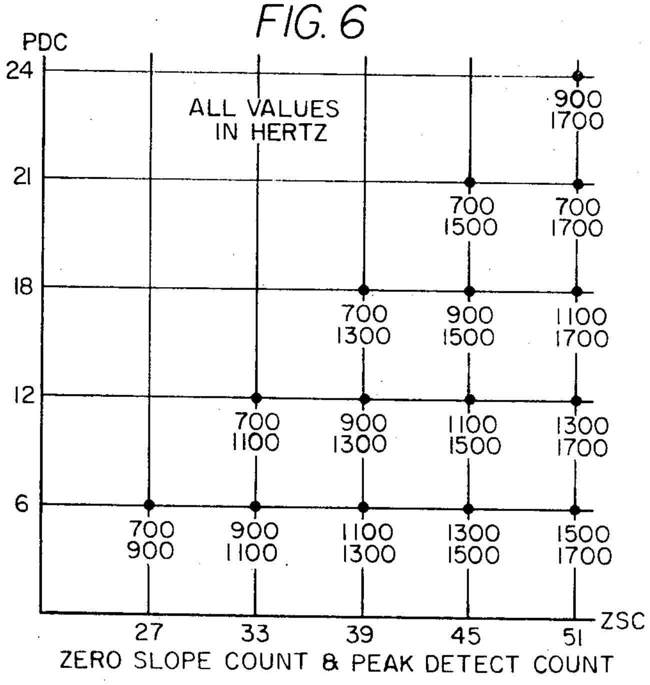
FIG. 7 is a diagram showing the zero slope counts and corresponding peak detect count of all tone pairs for a period of 30 milliseconds.

In order to detect a maximum component it is necessary to compare the contents of register 101 and register 102. The comparison circuit 105 shown in detail in FIG. 2 utilizes a bit by bit comparison technique. The OR gates 104 connected between the register 101 and register 103 and the comparison circuit 105 permits selection for comparison of information from register 101 or register 103 depending on control exercised by the gating control lead (GCL). During the timing sequence (see FIG. 6) channel 4 pulse position 4, the output of the comparison circuit 105 is examined for the presence of an output to be extended to the zero slope flip-flop 107. At this time the input to the comparison circuit is from register 101 and register 102. If 101 is greater than 102 the zero slope flip-flop 107 will be set to state 1. If 101 is less than 102 the zero slope flip-flop 107 will be set to zero. The truth table for this operation is as follows:

| ZSFF (t−1) | 101 > 102 | ZSFF (t) |
|---|---|---|
| 1 | 1 | 1 |
| 1 | 0 | 0 |
| 0 | 1 | 1 |
| 0 | 0 | 0 |

The change in the zero slope flip-flop 107 from 1 to 0 corresponds to the detection of a maximum, and the change from 0 to 1 corresponds to detection of a minimum. The number of changes from 0 to 1 (or the total number of minimums counted) are counted by the zero slope counter 111. When the zero slope flip-flop 107 changes from 1 to 0 the complement flip-flop 106 is set. This indicates that the maximum is detected during this frame and the second comparison should be made to detect the peak required for the peak detector counter 112.

In order to detect peaks the comparison is made between the contents of register 102 and register 103. When the complement flip-flop 106 is on during channel 5, the gating control lead provides the contents of register 103 for comparison. During that time period shown as GCLPP4 (FIG. 6) the output of comparison circuit 105 is examined for the condition of the peak detect flip-flop 108. If 102 is greater than 103 the peak detect flip-flop 108 is set to 1. If 102 is less than 103 the peak detect flip-flop 108 is set to 0. The truth table for this operation is as follows:

| PDFF (Pt−1) | B > C | PDFF (Pt) |
|---|---|---|
| 1 | 1 | 1 |
| 1 | 0 | 0 |
| 0 | 1 | 1 |
| 0 | 0 | 0 |

The peak detector counter 112 is used to count the total number of peaks detected.

It should be noted here that there are two comparisons to be performed in the same frame. The first comparison is performed between the present sample and the sample from one frame earlier (that between register 101 and register 102) in search of a maximum and minimum. Whenever maximum is found the complement flip-flop 106 is set so that the second comparison can be performed. (The comparison between register 103 and register 102 in search of a peak). The successive comparison requires that at the end of any previous comparison necessary information is stored for the next operation.

During the period of time designated GCLCH6 (FIG. 6) the contents of register 102 is transferred to register 103 and some time later the contents of register 101 is transferred to register 102. At the end of a definite period the contents of both counters are presented to the gating structure shown in detail in FIGS. 3 and 4 which selects the required combination of zero slope count and peak detector count to identify a tone pair. The final result is in terms of operation of two out of a possible six flip-flops operated to their on condition and then available for further processing in the telephone exchange. At the end the entire system is reset so that it is ready to receive the next tone pair.

To complete the understanding of the present invention the sequence of operations involved in detecting a single tone will be reviewed with reference to FIG. 1. Assume now that the registers are initially reset by means of a starting pulse which is initiated in response to detection of a previous tone pair. Initially information in the form of pulse code modulated signals received over the transmission line are serially loaded into register 101 at this time because of the reset, no information is stored in registers 102 or 103. Now an initial comparison is made between the contents of register 101 and register 102, to determine if the amplitude sample being checked in 101 is greater or less than that stored in register 102. Since the contents of register 101 is greater than register 102 it must then be determined if the zero slop flip-flop 107 is in its set or reset condition. Assuming that it is in the reset condition, the zero slope flip-flop 107 will be set at this time.

A second determination as to whether the contents of register 102 are greater than register 103 is made now. Since the contents of register 102 are equal/or greater than register 103 a determination must be made if the peak detect flip-flop 108 is in its reset condition. The peak detect flip-flop 108 was reset earlier as noted above.

Since the contents of register 102 are equal to or greater than register 103 flip-flop 108 will be set at this time and the peak detection counter 112 will be advanced by a count of "1", after which transfer will be effected of the contents from register 102 into register 103.

Returning for a moment if the contents of register 102 were less than that of register 103 it would have to be determined whether the peak detect flip-flop 108 was reset. If it has been reset, the peak detect counter 112 is unchanged and transfer is again effected from register 102 to register 103.

Returning once more, when the initial determination was made as to whether register 101 contents were greater than of register 102 it was originally determined that the zero slope flip-flop 107 had been reset. If, however, it had been determined that the contents of register 101 were less than register 102 the next determination to be made would be that of determining whether the zero slope flip-flop 107 had been reset, if it had been reset the zero slope counter 107 would have remained unchanged and transfer would have been effected from register 101 to register 102. The transfer of contents from register 102 to register 103 is performed only during those frame or time periods when a peak detection is made and peak detect counter 112 is advanced. However, transfer from register 101 to register 102 takes place during each time frame.

With the transfer of contents from register 101 to register 102 the sequence will be complete, and we can again load register 101 with an incoming 8 bit pulse code modulated word. Obviously the count registered in the zero slope counter 111 and the peak detect counter 112, is gated through the gating circuitry of FIGS. 3 and 4, in a conventional manner, (according to the logical combinations of gating shown thereon) and ultimately appears as a pair of latched signals at the output, of the gating circuits for use in the telephone exchange.

What is claimed is:

1. For use in a communication system including a switch center, apparatus for detecting the presence of information equivalent to multifrequency dialing signals, as transmitted sequentially over a transmission facility in pulse code modulated form to said switching center, said apparatus comprising: a plurality of registers serially connected to said transmission facility, sequentially operated in response to receipt of predetermined quantities of information in digital form to store a predetermined quantity of information in each of said registers in the received sequence, said plurality of registers including, a first register; a second register; a comparison circuit connected between said first and second register operated in response to determination that the relative digital value of information stored in said first register is greater than the value of information stored in said second register, first counting means; a first bistable circuit connected between said comparison circuit and said first counting means, set to a first state in response to operation of said comparison means; said first counting means operated in response to setting of said first bistable circuit to a first state.

2. Apparatus as claimed in claim 1 wherein; said comparison means are further operated in response to determination that the relative digital value of information stored in said first register is less than the value of information stored in said second register to set said first bistable circuit to a second state, a third register connected to said second register; first gating means connected between said comparison means and said first register and also connected between said comparison means and said third register and including logic circuit means for connecting said first bistable circuit to said first logic gating means, operated in response to said first bistable circuit operated to its second state to complete circuit connections from said third register to said comparison means, said comparison means further operated in response to determination that the relative digital value of information stored in said second register is greater than the value of information stored in said third register; second counting means; a second bistable circuit connected between said comparison means and said second counting means operated in response to said further operation of said comparison means to set said second bistable circuit to a first state, said second counting means operated in response to said second bistable circuit operation to a first state; second gating means connected to said first and to said second counting means operated in response to operation of said first and second counting means to decode the count stored therein and convert said decoded information into output signals representative of multifrequency dialing signals for use in said communication system.

3. Apparatus as claimed in claim 1 wherein said first register is of the serial input, parallel output type and said second and third registers are of the parallel input, parallel output type.

4. Apparatus as claimed in claim 1 wherein any information stored in said second register is first transferred to said third register; and information stored in said first register is subsequently transferred to said second register, said information transfers effected in response to different enabling pulses originating in said switching center, said switching center further providing reset pulses periodically on a cyclic basis, whereby all of said registers are reset.

5. Apparatus as claimed in claim 4 wherein is further included: a third bistable circuit operated in response to operation of said first bistable circuit to its first state, to periodically provide a gating pulse in combination with one of said enabling pulses provided by said switching center, for operation of said second bistable means.

6. Apparatus as claimed in claim 4 wherein said reset pulses are further employed to reset said first and second counting means periodically.

* * * * *

UNITED STATES PATENT OFFICE
CERTIFICATE OF CORRECTION

Patent No. 3,710,028 Dated January 9, 1973

Inventor(s) SATYAN G. PITRODA

It is certified that error appears in the above-identified patent and that said Letters Patent are hereby corrected as shown below:

Column 7, line 2, "switch" should be -- switching --

Signed and sealed this 29th day of May 1973.

(SEAL)
Attest:

EDWARD M.FLETCHER,JR.
Attesting Officer

ROBERT GOTTSCHALK
Commissioner of Patents